United States Patent Office 3,155,724
Patented Nov. 3, 1964

3,155,724
PROCESS FOR BRINGING STEREOISOMERIC MIXTURE OF BIS-(4-AMINOCYCLOHEXANE)METHANE CLOSE TO THE EQUILIBRIUM CONCENTRATION
Wilfred J. Arthur, Charleston, W. Va., assignor to E. I. du Pont de Nemours and Company, Wilmington, Del., a corporation of Delaware
No Drawing. Filed Dec. 29, 1961, Ser. No. 163,080
2 Claims. (Cl. 260—563)

This invention relates to the useful chemical intermediate bis(4-aminocyclohexyl)methane and to methods for obtaining stereoisomers thereof in desired proportions.

Under various conditions of preparing the above compound, hereinafter referred to as PACM, there may be produced or recovered one or more of the three stereoisomers, including mixtures of any two or all of these isomers. Certain processes, for example, tend to produce PACM mixtures relatively high in the cis, trans-isomer of PACM while others tend to produce such mixtures relatively high in the trans-trans-isomer of this compound.

Except for purification methods used to recover pure samples of any one of these stereoisomers no satisfactory method has yet been devised by which one of these isomers could be converted to another, or in which a mixture of stereoisomers of PACM in certain proportions could be converted to a mixture composed of other more desired proportions.

A need for this invention has long existed. For example, it is a characteristic of processes for making PACM stereoisomeric mixtures that, as an unwanted by-product, mixtures of stereoisomers in undesired proportions will be obtained. These unwanted mixtures have had to be discarded and therefore greatly and seriously decreased the yield of the wanted product based on the starting materials.

According to the broad concept of this invention, it has now been discovered that it is possible to take a single stereoisomer of the three stereoisomers of PACM, or a mixture of any two or all three of these stereoisomers, characterized in that such isomer or mixture of isomers is at a concentration other than the equilibrium concentration or equilibrium ratio of the isomer or isomers, and subjecting this to a certain treatment according to this invention as described below whereby the stereoisomer or mixture of stereoisomers is adjusted in concentration or ratio closer to the equilibrium concentration or ratio and, in a preferred embodiment, to and at the equilibrium concentration or ratio.

It will be clearly understood that the starting materials in the process of this invention are fully hydrogenated saturated stereoisomers of bis(4-aminocyclohexyl)methane, also described as di(para-aminocyclohexyl)methane, and hereinafter referred to as PACM.

It will also be understood that the expressions "equilibrium concentration" and "equilibrium ratio" are used in their conventional sense to mean the relative proportion of stereoisomeric PACM components in any given PACM product, wherein the stereoisomeric component or components are present in a state of greatest isomer stability and lowest free energy, as will be readily understood. For the three stereoisomers of PACM, the equilibrium concentration, as well as can be determined analytically, exists in the proportions by weight of about 54.5% trans, trans-isomer, about 38.5% cis,trans-isomers, and about 7% cis,cis-isomer.

It will be understood also that, for the first time, it is now possible to take a plain mixture of, say, 55% by weight of the cis,trans-isomer PACM, 8% by weight of the cis,cis-isomer, and 37% by weight of the trans,trans-isomer of PACM and convert this mixture readily to, say, a mixture of 53% trans,trans-isomer, 40% cis,trans-isomer, and 7% cis,cis-isomer. In the other direction from the equilibrium concentration, it is equally simple according to the present invention to take an isomeric mixture containing, say, about 70% by weight of the trans, trans-isomer of PACM, about 25% of the cis,trans-isomer of PACM, and the remaining 5% of the cis,cis-isomer, and convert this mixture according to the process of the present invention to a mixture containing these three isomers, respectively, in the proportions of approximately 54:40:6.

According to this invention, the starting stereoisomer material or mixture of stereoisomers of PACM not at equilibrium concentration is subjected to hydrogenation conditions using hydrogen at elevated temperatures and pressure, and preferably in a liquid solvent system, in the presence of a ruthenium catalyst and from 0.01 to 5 parts by weight of ammonia based on the weight of the total of PACM stereoisomers in the starting material.

It is important to emphasize that the starting PACM is fully saturated, i.e. fully hydrogenated, and therefore the process of the invention is not merely a simple hydrogenation reaction. For some reason not fully understood, the particular combination of hydrogenating conditions using hydrogen at elevated temperature and in the critical presence of a ruthenium catalyst and ammonia causes a shift of stereoisomer ratio towards the equilibrium concentration.

The process is carried out for a time sufficient to reach a desired isomeric ratio or content. Most frequently, it will be desired to attain the equilibrium concentration and this can readily be reached in less than one hour, and preferably less than 30 minutes, with times of 3 to 20 minutes very satisfactory and convenient. Once a desired isomeric ratio or content is achieved, additional holdup or exposure under the isomerization conditions of this invention serve no particular purpose but can be tolerated without extreme reduction in yield. Times in excess of 48 hours are not attractive.

The starting PACM stereoisomer or mixture of stereoisomers can be obtained in any suitable way. For example, the methods of Whitman U.S. Patent No. 2,606,924, issued August 12, 1952, produce a normally liquid mixture of isomeric PACM high in cis,trans-isomer content that can readily be converted by the present invention to a mixture approaching or at the equilibrium concentration.

The starting PACM can also have present up to about 20% ortho,para-di(aminocyclohexyl)methane.

The ruthenium catalyst will be used according to the present invention in an amount of at least 0.001 weight percent and less than about 10%, based on the starting PACM and calculated as metallic ruthenium.

Ruthenium catalysts have been described heretofore and comprise materials in which the active catalytic component is either elementary ruthenium, a ruthenium oxide, a salt of ruthenium in which the ruthenium is in the anion, or a salt of ruthenium in which the ruthenium is the cation and the anion is non-polymeric. Thus, there can be used such compounds as the oxides, for example ruthenium sesquioxide, ruthenium dioxide, and ruthenium tetraoxide; salts such as perruthenites, for example, barium perruthenite, sodium perruthenite, etc.; ruthenates, for example potassium, sodium, barium, strontium, calcium, magnesium and silver ruthenates, perruthenates, for example, potassium and sodium perruthenates, ruthenium halides, for example, ruthenium pentafluoride, and ruthenium dichloride, ruthenium trichloride and ruthenium tetrachloride, ruthenium chlorosalts, for example potassium chloroperruthenate, ruthenium sulfides, for example, ruthenium disulfide and trisulfide, ruthenium sulfate, ruthenium nitrosonitrate, and the like. The material can be activated by means well known in the art.

The ruthenium can be extended, if desired, on a carrier such as charcoal, silica gel, alumina, and the like. The extended catalysts can be made by fusing ruthenium or its oxide with sodium peroxide, dissolving the salt, pouring the resulting solution over the extender and drying the impregnated mass. Other known methods can, of course, be used.

It is not essential but is highly preferred that this process be carried out in a solvent for the PACM. The solvents which can be used according to this invention are generally organic solvents which are not subject to hydrogenation under the conditions of this process. In general, saturated alicyclic and aliphaatic solvents are suitable including alicyclic and aliphatic hydrocarbon ethers. Typical of suitable solvents can be mentioned n-hexane, cyclohexane, dioxane, dioxalane, ethyl ether, isopropyl ether, n-propyl ether, n-butyl ether, isobutyl ether, the amyl ethers, tetrahydrofuran, dicyclohexyl ether, and the like; aliphatic and alicyclic amines such as n-butyl amine, isopropyl amine, n-pentyl amine, iso-amyl amine, 2- ethylhexyl amine, n-hexyl amine, cyclohexyl amine, hexamethylenediamine, piperidine, hexahydroazepine, and the like. Alcohols such as methyl alcohol, ethyl alcohol, isopropyl alcohol can be used. Water can also be used.

The presence of the ammonia referred to above is an essential feature of this process. While amounts of from 0.01 to about 5 parts by weight can be used as mentioned above, there appears to be no upper limit to the amount of ammonia which can be present without deleterious effect on the process and amounts as high as 10 or 100 or 200 parts by weight and even higher can be used. However, amounts within the range from about 0.05 to 0.25 part by weight will ordinarily be preferred.

Surprisingly, the use of ammonia in this process does not lengthen the necessary reaction or equilibration time but, for some reason which is not fully understood, the use of ammonia in this particular process permits such reaction periods as well under one hour, and even as low as a few minutes, as mentioned above.

This process will be carried out at elevated temperatures and pressures. Temperatures on the order of 180° to 250° C., and preferably about 200° to 220° C., should be used.

The process is run at hydrogen partial pressures above about 500 pounds per squade inch and preferably from about 2000 to 3500 pounds per square inch. Higher hydrogen partial pressures can, of course, be used but no practical advantage is seen from this. Ordinarily, total pressures below about 15,000 pounds per square inch will be used for practical reasons. Lower hydrogen partial pressure may be used or no hydrogen at all added as vapor, but this leads to slow isomerization and marked product decomposition, with attendant lower yields.

When a solvent is used, it can be used in as low a concentration as about 0.2 part of solvent per part of PACM introduced into the reaction. However, in these lower amounts of solvent certain disadvantages such as partial catalytic deactivation may occur and therefore amounts of solvent from about 0.6 to about 1.0 part of solvent per part of PACM should be used. Greater amounts of solvent can, of course, be used, even as high as 10 or 20 parts or more of solvent per part of PACM, but this merely dilutes the components in the reaction mass with no particular advantages obtained.

It will be understood that this process can be carried out in a batch operation, or in a continuous or semi-continuous operation. It will also be readily appreciated that the process encompasses, in a process for the hydrogenation of bis(4-aminophenyl)methane to PACM, wherein such hydrogenation is effected at elevated temperature and pressure using a ruthenium catalyst and in the presence of ammonia, recycle of part or all of the fully saturated hydrogenated PACM back into the reaction zone where it is subjected to the critical conditions of the process of the present invention.

Such a recycle operation in PACM manufacture thus permits the preparation of a PACM product at or very close to the equilibrium concentration, and this can also be followed by crystallization to produce a material high in the trans,trans-isomer. The remaining mother liquor, e.g., rich in cis,trans-isomer and heretofore considered either waste and yield loss or in any event not useful for the identical purpose as the PACM at equilibrium concentration, or at higher than equilibrium trans,trans-isomer concentrations, is readily recycled back into the main reaction where it is subjected to the conditions of the present invention and quickly converted to the desired concentration. The reverse is also possible: that is, to retain the liquid or high cis,trans-isomer mixture and recycle the high trans-trans-isomer fraction for isomerization back to equilibrium concentration. Over-all, this achieves a remarkably high yield of the desired PACM with production of little or no unwanted PACM by-product.

In a recycle operation the amount of PACM being recycled will, of course, depend on the amount of undesired PACM stereoisomers present as co-products. It will be understood that a larger amount of recycle will ordinarily be in those operations where the PACM originally produced is further away from the equilibrium concentration of the mixture of isomers or where the desired isomer content to be obtained by a subsequent separation process is further from the equilibrium.

The usefulness of equilibrium concentration mixtures of stereoisomeric PACM is well known. Reaction of such PACM with sebacic acid forms polyamides of high melting point.

This invention will be better understood by reference to the following illustrative examples wherein parts are by weight unless otherwise specified.

*Example 1*

At a temperature of 210° C. and a total pressure of 5,000 pounds per square inch gage, 100 milliliters of dioxane, 25 grams ammonia, and 100 milliliters of PACM having a freezing point of 34° C. and containing about 39% trans,trans-isomer is subjected to an atmosphere of $H_2$ in the presence of 10 grams of a catalyst comprising 5% ruthenium on finely divided alumina, for 10 minutes. The ammonia, catalyst, and solvent are removed by filtration and distillation and the resulting product is distilled overhead under vacuum to yield 3.2% of lower boiling deaminated by-products, 0.9% higher boiling condensation by-products, and 95.9% PACM having a freezing point of 42.2° C., and containing about 50.2% of the trans, trans-isomer.

*Example 2*

In a pressure vessel is charged 9 grams of finely divided 5% ruthenium-on-alumina catalyst, 30 grams ammonia, 100 milliliters dioxane, and 100 milliliters of a PACM showing 36.3° C. freezing point and about 42% trans, trans-isomer. The vessel and contents are heated to 195° C. and pressured with hydrogen to a total pressure of 5,000 pounds per square inch gage, for 30 minutes, after which it is cooled, depressured, and discharged. The amomnia, catalyst, and solvent are removed by filtration and distillation and the crude product is distilled under vacuum to yield 1.9% low boilers, 1.0% high boilers, and 97.1% PACM having a freezing point of 43.7° C. and a trans,trans-isomer content of 53%.

*Example 3*

At a temperature of 200° C. and a total pressure of 5,000 pounds per square inch gage, 8.0 grams of 5% ruthenium-on-alumina catalyst, 20 grams anhydrous ammonia, 75 milliliters of dioxane, and 75 milliliters of a PACM having a freezing point of 64.1° C. and 97% trans, trans-isomer is exposed to a hydrogen atmosphere for 30 minutes. The ammonia, catalyst, and solvent are removed by filtration and distillation and the crude product is distilled overhead under vacuum to give 3.3% lower boiling by-products, 1.6% higher boiling residue, and 95.1% PACM having a freezing point of 45.9° C. and a trans,trans-isomer content of 56.8%.

*Example 4*

In a pressure vessel operating at 200° C., 5,000 pounds per square inch gage, 10 grams of finely divided 5% ruthenium-on-alumina, 30 grams ammonia, 50 milliliters dioxane, and 150 milliliters of a PACM having a freezing point of 25° C. and a trans,trans-isomer content of about 29% is subjected to hydrogen for a period of 30 minutes. Freed of ammonia, catalyst, and solvent by filtration and distillation, the crude product is distilled overhead under vacuum to give 1.0% lower boiling by-products, 2.1% higher boiling by-products, and 96.9% PACM having a freezing point of 42.4° C. and a trans,trans-isomer content of 51%.

*Example 5*

At a temperature of 210° C. and at 5,000 pounds per square inch gage, 100 milliliters of di-isopropyl ether, 40 grams of anhydrous ammonia, 20 grams of catalyst comprising 4.6% ruthenium on an alumina-silica support, and 100 milliliters of a PACM stereoisomer mixture having a freezing point of 28° C. and containing about 31.5% trans,trans-isomer is agitated in the presence of gaseous hydrogen for 15 minutes. The ammonia, catalyst and solvent are removed by filtration and distillation and the crude product is distilled overhead under reduced pressure to give 0.6% lower boiling by-products, 0.7% higher boiling by-products, and 98.7% PACM with a freezing point of 43.8° C. and a trans,trans-isomer content of about 53%.

*Example 6*

At a temperature of 200° C. and employing addition of hydrogen to attain a total pressure of 5,000 pounds per square inch gage, 91 grams of di-n-butyl ether, 25 grams ammonia, and 105 grams of a PACM having a freezing point of 24.6° C. and containing about 28% trans,trans-isomer is contacted with 15 grams of a finely divided catalyst comprising about 5% ruthenium on an alumina support, for a period of 30 minutes. The ammonia, catalyst, and solvent are removed by filtration and distillation and the resulting crude product is distilled under vacuum and fractionated to give 1.2% low boiling deaminated by-products, 1.0% high boiling condensation products, and 97.8% PACM having a freezing point of 42.7° C. and containing about 51% trans,trans-isomer, about 41.5% cis,trans-isomer, and about 7.5% cis,cis-isomer.

*Example 7*

At a temperature of 210° C. and a total pressure of 5,000 pounds per square inch gage, 25 grams ammonia, 10 grams of a catalytic material comprising about 5% ruthenium on a finely divided alumina, and 100 grams of a PACM having a freezing point of 18° C. and containing about 25% trans,trans-isomer, 59% cis,trans-isomer, and 16% cis,cis-isomer are subjected to a hydrogen atmosphere for a period of 30 minutes. There is no measurable absorption of hydrogen during this period. The final crude product is distilled overhead at sub-atmospheric pressure to give about 1.6% of lower boiling deamination by-products, 2.4% of higher boiling condensation products, and 96% of a PACM having a freezing point of 43.4° C. and containing about 53% trans,trans-isomer, 39.5% cis,trans-isomer, and 7.5% cis,cis-isomer.

*Example 8*

In substantially the same manner and under the same conditions described in Example 7, PACM having a freezing point of 18° C. and containing about 25% trans,trans-isomer is isomerized to provide a crude product with a freezing point of about 42.5° C. containing about 52% trans,trans-isomer. This material is allowed to crystallize slowly and partially and is centrifuged to separate the existing liquid and solid phases. The solid phase is found to be approximately 40% of the starting material and to consist of PACM having a freezing point of 46° C. and containing approximately 60% trans,trans-isomer. The more liquid phase is found to be about 60% of the starting material and to consist of PACM having a freezing point of 40° C. and containing about 47% trans,trans-isomer. This latter material is again subjected to the isomerization conditions herein detailed and the product again is found to be PACM containing about 52% trans,trans-isomer. This material is again subjected to fractional crystallization and centrifugation and the solid phase is found to be about 50% of the material subjected to this separation and to be PACM with a freezing point of 46.3° C., and containing about 60% trans,trans-isomer. The more-liquid material resulting from this separation is found to be PACM having a freezing point of 35° C. and containing about 42% trans,trans-isomer, 45% cis,trans-isomer, 8% cis,cis-isomer, and about 5% byproducts, all of which can again be satisfactorily recycled to the isomerization step.

The above examples can be repeated substituting other materials and other process conditions as hereinbefore described for corresponding features of the above examples, as will be readily understood by persons skilled in the art with equally satisfactory results.

The invention claimed is:

1. The process for taking a mixture of stereoisomers of bis(4-aminocyclohexyl)methane, said mixture being not at the equilibrium concentration of stereoisomeric bis(4-amino-cyclohexyl)methane, and bringing said mixture closer to the equilibrium concentration, said process comprising subjecting said mixture to gaseous hydrogen at a partial hydrogen pressure above about 500 pounds per square inch and a temperature from about 180° C. to 250° C. in the presence of a ruthenium catalyst and from 0.01 to 200 parts by weight of ammonia based on the weight of said mixture.

2. The process as set forth in claim 1 wherein said process is carried out in a liquid inert organic solvent system.

References Cited in the file of this patent

UNITED STATES PATENTS

| 2,494,563 | Kirk et al. | Jan. 17, 1950 |
| 2,606,925 | Whitman | Aug. 12, 1952 |
| 2,606,928 | Barkdoll et al. | Aug. 12, 1952 |

OTHER REFERENCES

Barkdoll et al.: J.A.C.S., vol. 75, pp. 1156–1159 (1953).